United States Patent [19]

Dantes

[11] 4,373,628
[45] Feb. 15, 1983

[54] WOODWORKING PLANE HOLDER

[76] Inventor: Christopher Dantes, 40 Kale Rd., Rocky Pt., N.Y. 11778

[21] Appl. No.: 271,538

[22] Filed: Jun. 8, 1981

[51] Int. Cl.³ .............................................. B65D 61/00
[52] U.S. Cl. .................................. 206/349; 145/5 R; 206/45.14
[58] Field of Search .................... 206/487, 488, 349; 145/5 R, 15; 30/296 R, 296 A, 231, 151; 294/144, 145, 172; 7/167, 168

[56] References Cited

U.S. PATENT DOCUMENTS

| 1,625,171 | 4/1927 | Tanner | 206/45.3 |
| 3,698,087 | 10/1972 | Cowdrey et al. | 30/231 |
| 3,719,301 | 3/1973 | Boppart | 217/5 R |

FOREIGN PATENT DOCUMENTS

| 7801160 | 8/1978 | Netherlands | 211/60 T |
| 1371524 | 10/1974 | United Kingdom | 145/5 R |

*Primary Examiner*—William Price
*Assistant Examiner*—Brenda J. Ehrhardt
*Attorney, Agent, or Firm*—Richard G. Geib

[57] ABSTRACT

A holder for a plane that will protect the plane's blade when in storage and allow for vertical storage of the plane and holder.

4 Claims, 4 Drawing Figures

WOODWORKING PLANE HOLDER

BACKGROUND

Heretofore devices to permit storage of a plane have embodied rubber feet on the plane shoe to raise same above the surface on which it is resting to preclude blade damage. These devices have required the user of the plane to apply heavy downward pressure as the plane is being used to finish (trim) a wood surface.

SUMMARY

It is the principle object of this disclosure to teach those skilled in the art how to construct a plane holder that will not interfere in any way with plane use.

A more particular object of this invention is to provide an enclosure for a plane that will permit horizontal and vertical storage in a protected environment.

A still further object of this invention is to provide a holder that will loosely encase a wood plane so that same may be protected from contact and yet be simply and quickly released from the holder for useful work.

DRAWING DESCRIPTION

DETAILED DESCRIPTION

Figure 1:
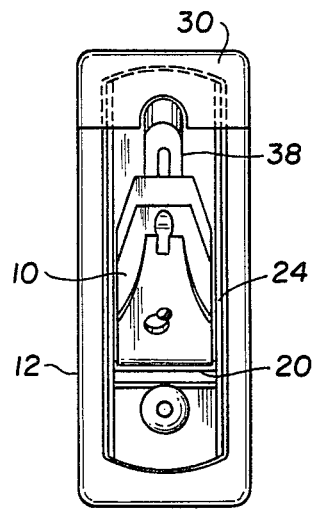
FIG. 1 is a side view of a holder with a wood plane therein shown in its vertical storage position.
Figure 2:
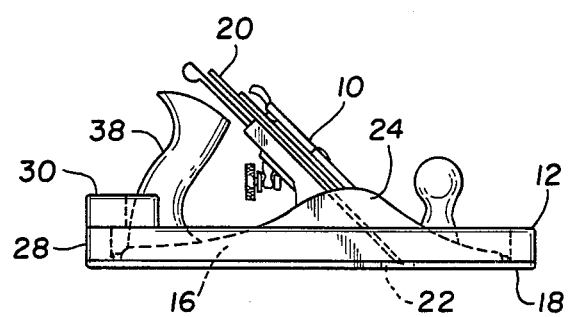
FIG. 2 is a side view of the holder with a wood plane therein in a horizontal storage attitude.
Figure 3:
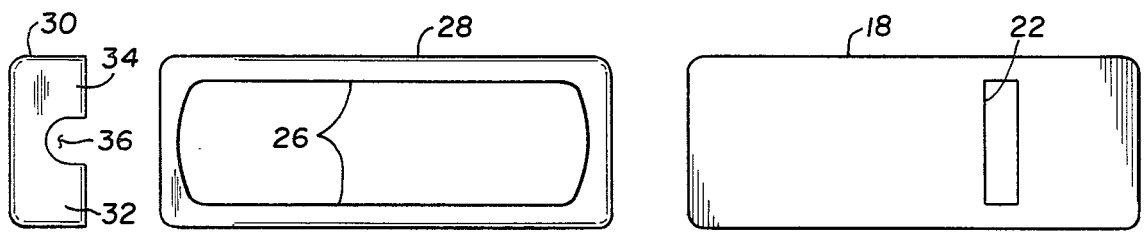
FIG. 3 is an exploded detail of plan and side views of the elements of a holder according to this invention; and, FIG. 4 is an isometric view of a holder construction according to this invention.
Figure 3:
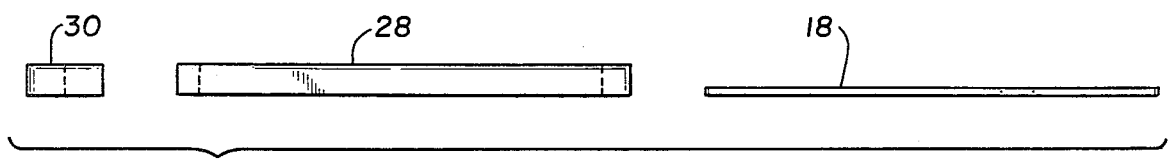

With particular regard to FIGS. 1 and 2 there is shown a wood plane 10 within a holder 12 according to this invention. More particularly, the wood plane 10 is placed within a cavity 14 (See FIG. 4) so that the shoe 16 of the wood plane 10 rests against a base 18 with the blade 20 over and partially within a cut-out portion 22 of base 18. In such attitude sides 24 of the plane 10 are closely adjacent the inner sidewalls 26 of the enclosure 28. Enclosure 28 may be bonded, screwed or nailed to base 18 so as to provide the bottom closed cavity 14.

Figure 4:
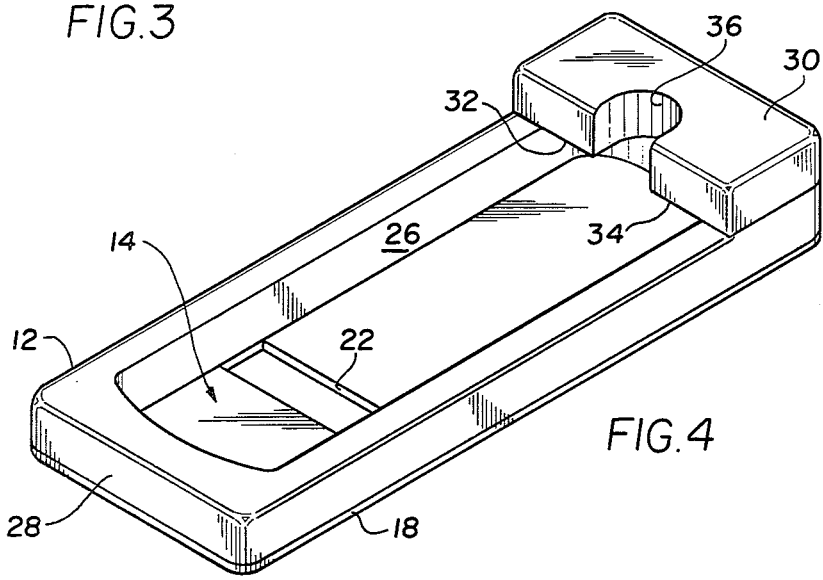

The holder assembly is completed by joining, in similar fashion, a cover 30 to one end of the enclosure 28 so that side portions 32 and 34 to either side of radiused cut-away 36 partially overlie an end of the cavity, as shown by FIG. 4.

With such a construction the plane handle 38 fits within the radiused cut-away 36 with the plane shoe in cavity 14 and at one end, the end with the handle, under the side portions 32 and 34. In such placement the plane is moved within the cavity by taking the handle end and angling it under cover 30 until the other end of the shoe can be dropped into the cavity 14.

Having described an operative embodiment of our disclosure it is now desired to set forth the intended protection sought by these Letters Patent in the appended claims:

1. A wood-working plane holder comprising:
   a flat rectangular base structure, said base having a rectangular cut-out portion transverse to said base and shaped and located therein to receive the blade of a plane;
   a hollow rectangular enclosure attached to said base and forming therewith a cavity of predetermined size to receive a plane; and
   a cover for the cavity attached to said rectangular enclosure at one end thereof so that the cover overlies a portion of the cavity at said one end.

2. The holder of claim 1 wherein the base cut-out portion is located in the base so as to receive and protect the blade of a plane when within said enclosure.

3. The holder of claims 1 or 2 wherein the cover is provided with a radiused cut-away to receive a handle of said plane.

4. The holder of claims 1 or 2 wherein the cover is provided with a radiused cut-away to receive a handle of said plane and has an undersurface overlying the end of the cavity to overlie a portion of a shoe for a plane within the cavity to prevent the plane from falling out of the holder when the latter is stood with the cover end up.

* * * * *